UNITED STATES PATENT OFFICE.

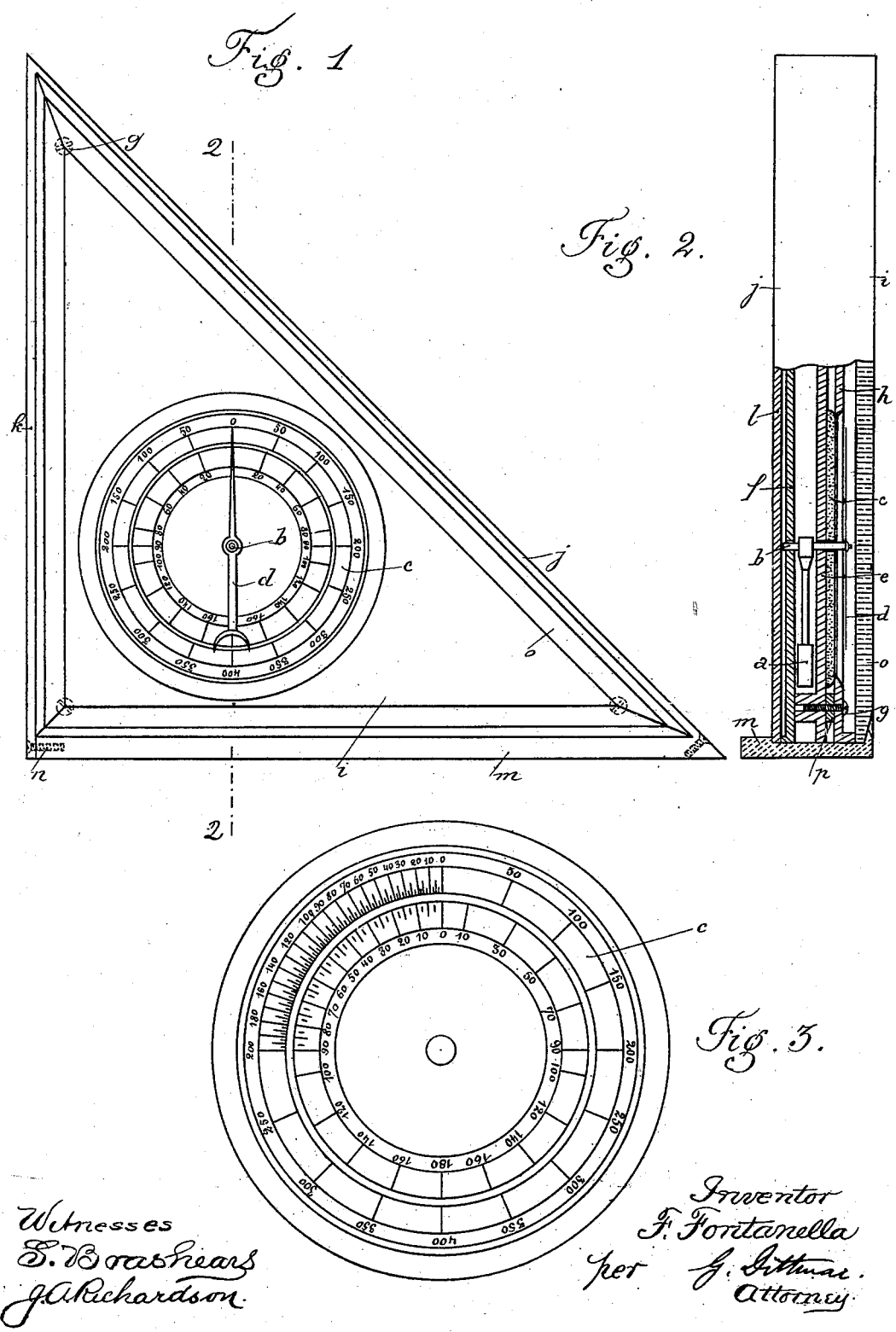

FRANÇOIS FONTANELLA, OF SAN REMO, ITALY.

LEVELING-SQUARE.

SPECIFICATION forming part of Letters Patent No. 666,190, dated January 15, 1901.

Application filed September 8, 1900. Serial No. 29,420. (No model.)

*To all whom it may concern:*

Be it known that I, FRANÇOIS FONTANELLA, a subject of the King of Italy, residing at San Remo, Italy, have invented certain new and useful Improvements in Squares, Levels, &c.; and I do hereby declare the following to be a full, clear, and exact description of the invention, such as will enable others skilled in the art to which it appertains to make and use the same.

This invention is in the nature of a device capable of use as a common square, rim-square, level, and for analogous purposes; and the invention consists in a single structure embodying these instruments, the improved construction, arrangement, and combination of parts being hereinafter fully described and afterward specifically claimed.

In the accompanying drawings, Figure 1 is a front view of a device constructed in accordance with my invention. Fig. 2 is a vertical sectional view on the plane indicated by the broken line 2 2 of Fig. 1. Fig. 3 is an enlarged front view of the dividing-plate.

Like letters indicate the same parts in all of the figures.

Referring to the drawings by letters, $a$ indicates a pendulum secured to a pivot $b$, mounted to oscillate in a dividing-plate $c$, said pivot also carrying on its opposite end a hand or pointer $d$. $e$ and $f$ are two triangular plates which serve as supports for the dividing-plate and the pendulum and pointer. These plates are joined together by screws and fixed to the plate $h$, which is placed in front of the dividing-plate, giving it greater stability. Small separator-blocks $p$ keep the plates apart and in parallel positions.

$i$ is the inclosing case, composed of three plates $j$, $k$, and $m$, the latter serving as the rim of the square and as the foot of the level, $m$ and $k$ being at right angles to each other and are separably secured together by screw $n$.

$o$ is a glass plate fitted in front of the dial-plate, which is provided with inner and outer concentric scales, the inner scale indicating degrees and the outer scale meters.

In the operation of the device when the bottom plate $m$ rests on a level surface the pointer will be at zero on both scales, which will also be the case when the side $k$ is held against a vertical surface. Should these surfaces be inclined from the horizontal or vertical, as the case may be, the pendulum by virtue of its specific gravity will hang perpendicularly, causing the pointer to move to one side or the other on the scales, thus indicating on the inner scale in degrees the angle of inclination of $m$ from the horizontal, or $k$ from the vertical, and upon the outer scale in meters the amount of raise in said inclination to a given distance on the horizontal or vertical plane.

It will be obvious that the device may be used as a common square or rim-square without reference to the pointer or pendulum.

Having thus fully described my invention, what I claim as new, and desire to secure by Letters Patent of the United States, is—

A triangular frame having its base and vertical side at a right angle to each other comprising a rim forming the base, vertical and diagonal edges, two parallel plates in said frame secured together at a distance apart, a dial-plate on the outside of one of said plates, having concentric metrical and degree scales, an outer plate having a glazed opening to expose the dial-plate, a pivot journaled in the parallel plates and the dial-plate, a pointer on the end of the pivot operating on the dial-plate, and a pendulum secured to the pivot between the parallel plates diametrically opposite to the pointer, all substantially as and for the purposes set forth.

In testimony whereof I affix my signature in presence of two witnesses.

FRANÇOIS FONTANELLA.

Witnesses:
EMILE DESPAGNE,
CARBONETTO STEFANO.